United States Patent Office 3,384,410
Patented May 21, 1968

3,384,410
TONG GEAR
Adam J. R. Belford, Corby, Northants, England, assignor to Stewarts and Lloyds Limited, Glasgow, Scotland
Filed June 20, 1966, Ser. No. 558,840
Claims priority, application Great Britain, June 23, 1965, 26,680/65
8 Claims. (Cl. 294—112)

ABSTRACT OF THE DISCLOSURE

Tong gear having a hoisting mechanism, tongs pivoted on a yoke for gripping an article, inclined guides acting on the tongs and displaceable relative thereto so that the tongs can exert a gravity grip on the article when hoisted, and means for increasing the grip of the tongs after the gravity grip has been effected.

---

This invention is concerned with tong gear and particularly, but not exclusively with tong gear for vertical ingot chargers such as are used, for example, for transfer of steel ingots to and removal of steel ingots from soaking pits. More specifically, the invention is concerned with so-called "inclined plane tong gear" in which tongs pivoted to a yoke are movable to grip or release an article under the control of inclined "planes" or guides on a control member displaceable relative to the yoke, these "planes" or guides acting on the tongs by means of a wedge or cam action.

It is an object of the present invention to provide tong gear operable to grip an ingot or other article so that an accidental upthrust will not release it and also operable to release the article readily in the required position.

The invention provides inclined plane tong gear comprising hoisting means for hoisting the control member and the yoke, first operating means for acting on the yoke for raising it relative to the control member to open said tongs and for allowing the yoke to move down under gravity relative to the control member to close the tongs, and second operating means for acting on both the control member and the yoke to displace them positively relative to one another in a direction for closing the tongs. Thus, an article can as required be gripped under the action of gravity or by applied power.

If the weight of the yoke and parts attached thereto and movable under gravity therewith is excessive the first operating means may be provided with a counterweight or motor to compensate for the dead weight.

To avoid undesirable interference between the hoisting means, the first operating means and the second operating means, lost-motion connections may be provided.

In a preferred arrangement, the second operating means comprises at least one pulley connected to the control member and at least one pulley connected to the yoke, and a rope passing round the pulleys and connected to tightening means, the pulleys and the rope being so arranged that tightening of the rope urges the pulleys towards one another.

The hoisting means preferably comprises a main hoisting drum around which pass a plurality of ropes connected respectively to the yoke, the control member and the second operating means. The first operating means preferably includes a pulley connected to the yoke and a rope passing from said main hoisting drum and round the pulley to tightening means.

The tightening means may, for example, comprise drums or hydraulic rams.

Figure 1:
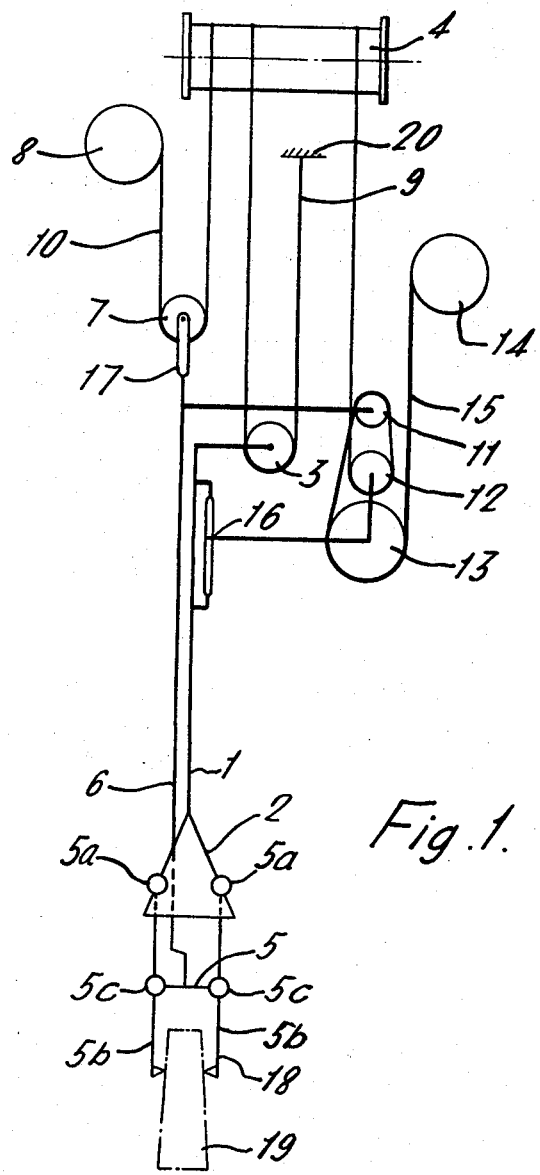
Figure 2:
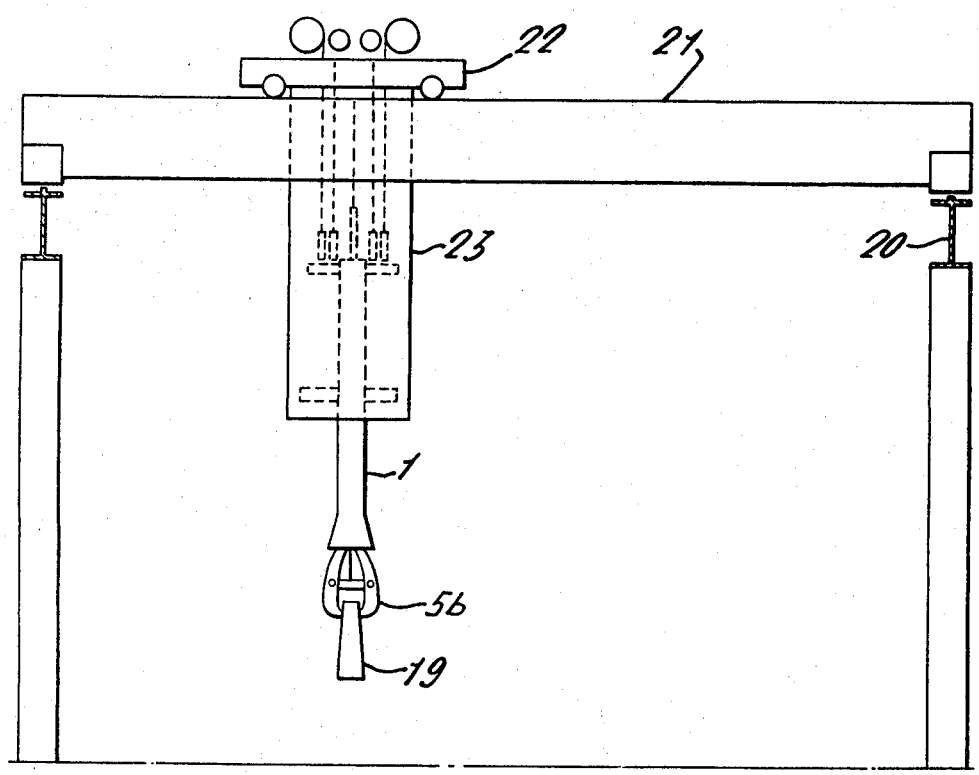
Figure 3:
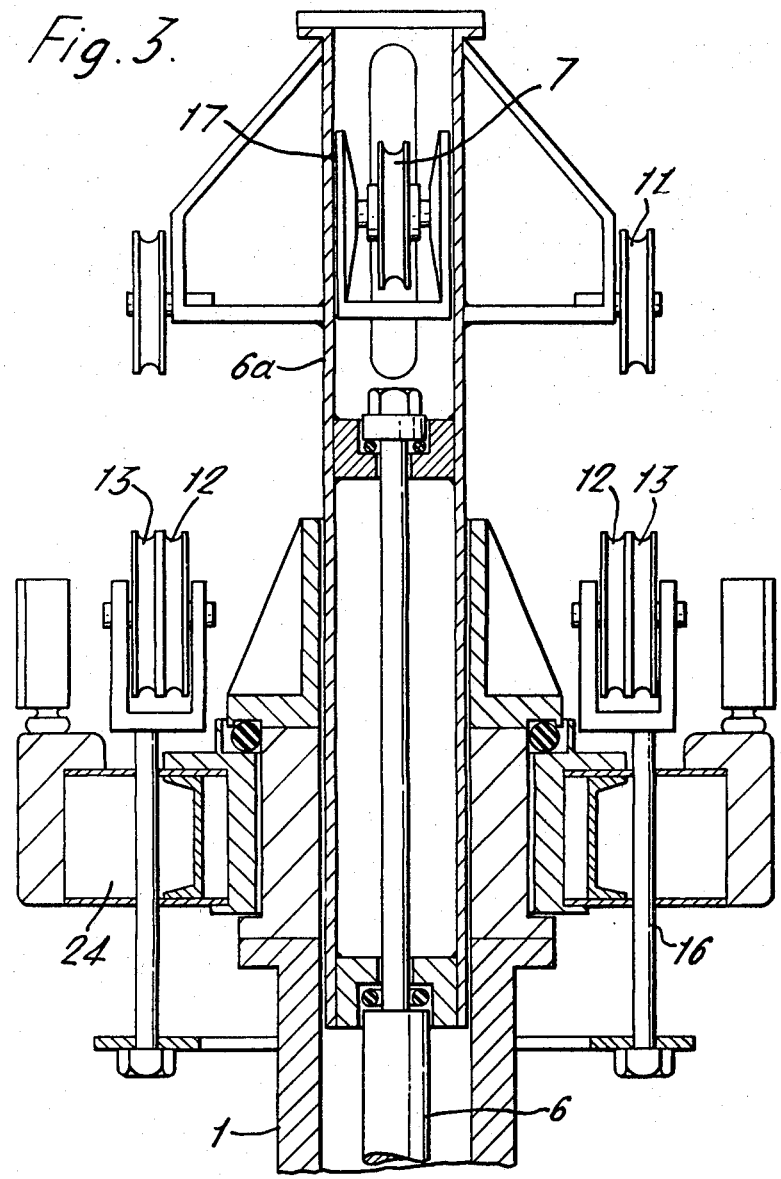

The following is a description, by way of example, of an embodiment of the invention, reference being made to the accompanying schematic drawings, in which FIGURE 1 shows an inclined plane tong gear in accordance with the invention for a vertical ingot charger,
FIGURE 2 shows a vertical ingot charger having tong gear as shown in FIGURE 1, and
FIGURE 3 shows in partial section a construction of mast head for the charger of FIGURE 2.

Referring to FIGURE 1, the gear has a vertical mast 1 which carries at its bottom a control member 2 having two downwardly diverging planes (in the form of the sides of slots) engaged by pins 5a (lying in said slots) at the upper ends of two tongs 5b which are pivoted at 5c to a yoke 5. The yoke 5 (which is vertically movable relative to the control member 2) is carried by a rod 6 connected at its upper end to a pulley 7 by a pin and slot connection allowing lost motion.

A main winding drum 4 having a suitable drive carries a rope 9 which passes round a pulley 3 connected to the top of the mast 1 and is anchored at 20 to the hoist frame. From the drum 4, a rope 10 passes round the pulley 7 and is wound on a gravity tong drum 8 having a suitable drive. From the drum 4, a third rope 15 is wrapped round a pulley assemblage 11, 12, 13 and finally round a power grip drum 14 with a suitable drive. The pulley assemblage comprises one or more pulleys 11 connected to the rod 6 and an adjacent set of pulleys 12, 13 connected to the mast 1 by a pin and slot connection 16 allowing lost-motion.

The operation of the gear is as follows:

Rotation of the drum 4 by a suitable drive hoists or lowers all three ropes 9, 10 and 15 at equal speeds. Since each rope passes round in effect a single pulley, the whole mast and tong assembly is thus raised or lowered without relative movement of the elements.

If the lost motion connection 16 is in approximately the mean position, operation of the drum 8 will raise or lower the rod 6 and the yoke 5, causing the tongs to open or close by movement of the pins 5a in the slots of the member 2. To engage an ingot 19, the rope 10 is lowered until the tongs makes contact with the ingot and then slightly overlowered whereby the pulley 7 works down the slot of the lost motion connection 17. This results in a gravity grip on the ingot owing to the pins 5a being urged down, under the weight of the parts attached thereto, against the inclined planes of the control member 2.

An ingot being transported under gravity grip is liable to accidental unlocking due to premature or accidental contact. Therefore, when the gear is in the gravity grip state, the drum 14 may be hoisted. This hoisting draws together the pulleys 11, 12, 13 and thus raises the latter pulleys through a stroke allowed by the lost motion connection 16. When all lost motion has been taken up, further hoisting of the drum 14 tends to force the inclined planes of the control member 2 up against a down thrust of the yoke 5. This action provided a power grip on the ingot.

In terms of relative magnitude of grip, the inclined planes on the control member 2 give a wedge action so that the grip is a function of the vertical force at the control member. In the case of gravity grip, the vertical force is the weight of the ingot, tongs, yoke and rod. In the case of the power grip, the rope 15 in the limit carries the total weight of the ingot, tongs, yoke and rod and also the control member and mast. All this weight hangs from two lengths of the rope 15, the number of falls between the pulleys 11, 12, 13 (i.e., the number of wraps of the rope round the pulleys) constitutes a multiplying factor $r$, so the vertical force is equal to said total weight multiplied by $r/2$. By increasing the number of wraps $r$, any desired power grip may be obtained.

Control gear for the apparatus described above may be arranged to operate as follows:

(1) With drum 8 hoisted and tongs open, approach ingot.
(2) For gravity grip, lower drum 8.
(3) For power grip, hoist drum 14.
(4) To raise ingot, hoist drum 4. The crane may then be travelled.

The reverse procedure would be:

(5) With drum 14 hoisted and power grip thus applied, commence lowering.
(6) As destination is approached, for gravity grip, lower drum 14.
(7) To ungrip, hoist drum 8 immediately before or after bottoming ingot.

This control gear may conveniently have a single control lever with three operating positions corresponding to the ungripped condition, gravity grip and power grip.

Suitable limit switches may be utilised to limit the lowering of the drums 8 and 14 to come within the mean lost motion range. Alternatively slack rope limit switches may be used to enable the lowered drums to take up slack rope while maintaining their elements at the lower end of the lost motion slots.

The pulley 7 may be at the upper end of the associated lost motion slot when the power grip is applied. Therefore, a slipping clutch (or a slipping rope with counterweight) may be incorporated at the drum 8. This arrangement would not slip under the weight of the tongs, yoke and rod, but would not be able to sustain the weight of an ingot or the downward force exerted by the power grip. The arrangement would therefore make it impossible to release an ingot from a height and also ensure that the power grip would not be nullified by tension on the rope 10.

In place of the drums 8 and 14 hydraulic rams may be used, giving the advantage that the force exerted may be accurately controlled by means of relief valves.

In practice, the ropes, pulleys and inclined planes, and other members as appropriate, will normally be duplicated to give a symmetrical arrangement.

FIGURE 2 shows a vertical ingot charger in the form of an electric overhead travelling crane having a bridge 21 running on a gantry 20. On the bridge 21 runs a trolley 22 with the winding drums, etc., and depending from the trolley is a hanger frame 23. The mast 1 of the gear of FIGURE 1 slides in the hanger frame 23 and is preferably constrained from tilting by guides. Normally the mast is capable of being rotated in addition to being raised and lowered. A practical construction of mast head permitting rotation of the mast is illustrated in FIGURE 3, in which the reference numerals correspond to those in FIGURE 1. A top plate 24 has attached thereto pulleys 3 (not shown). The top plate and the upper part 6A of the rod 6 are constrained from rotation, while the mast 1 and the lower part of the rod 6 are free to rotate and may be rotated by a slew motor (not shown).

I claim:

1. An inclined plane tong gear mechanism comprising a yoke, tongs pivoted to the yoke for gripping and releasing an article, a control member displaceable relative to the yoke and having inclined guides acting on said tongs and controlling the pivotal movement thereof, first operating means for causing relative displacement between said control member and said yoke in one direction for opening said tongs and allowing relative displacement in the opposite direction under gravity for closing said tongs, second operating means operable on said control member and said yoke when said tongs are in their closed position to increase the grip exerted by said tongs, and hoisting means acting on said yoke, said control member, and said first and second operating means in such a manner to maintain their positions relative to each other during hoisting.

2. The mechanism according to claim 1, wherein said second operating means comprises at least one pulley connected to the control member, at least one pulley connected to the yoke, a rope passing around said pulleys, and tightening means connected to said rope for tightening the rope and urging said pulleys towards one another.

3. The mechanism according to claim 1, wherein a lost-motion connection is provided between said first operating means and said yoke.

4. The mechanism according to claim 1, wherein a lost-motion connection is provided between said second operating means and said control member.

5. The mechanism according to claim 1, wherein said hoisting means comprises a main hoisting drum and a plurality of ropes passing around said drum and connected respectively to the yoke, the control member and the second operating means.

6. The mechanism according to claim 1, wherein said guides are arranged to diverge downwardly, said first operating means being arranged to allow said yoke member to be displaced downwardly under gravity relative to said control member for closing the tongs.

7. The mechanism according to claim 6, wherein said first operating means comprises a pulley connected to the yoke, a rope connected to said hoisting means and passing around said pulley, and tightening means connected to said rope.

8. The mechanism according to claim 7, wherein said second operating means comprises at least one additional pulley connected to the control member, at least one additional pulley connected to the yoke, an additional rope connected to said hoisting means and passing around said additional pulleys, and additional tightening means connected to said additional rope for tightening said additional rope and urging said additional pulleys towards one another.

References Cited
UNITED STATES PATENTS 1,439,245  12/1922  Knapp _____ 294—112 X
2,219,479  10/1940  Harry _____ 294—112

ROBERT G. SHERIDAN, *Primary Examiner.*

GERALD M. FORLENZA, *Examiner.*

G. F. ABRAHAM, *Assistant Examiner.*